March 14, 1933.  C. G. HALL  1,901,509
COMBINATION TRAY HEATING AND REFRIGERATING CABINET
Filed March 17, 1930   3 Sheets-Sheet 1
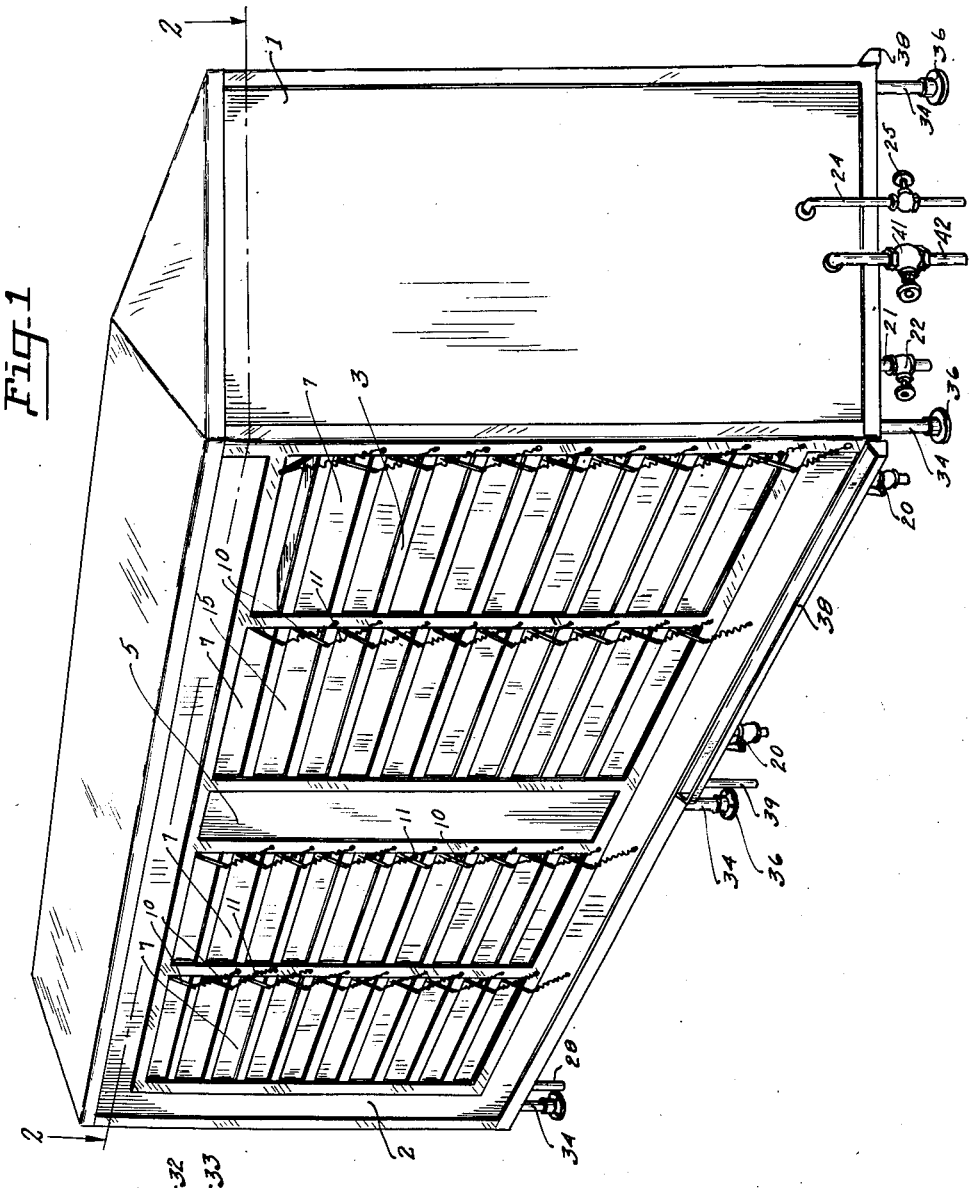
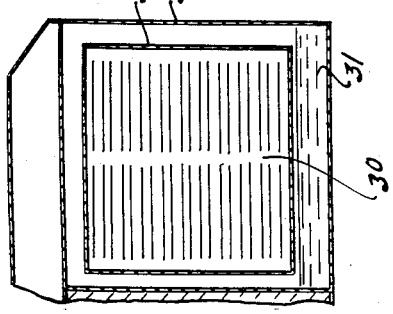
Charles G. Hall
INVENTOR
ATTORNEY

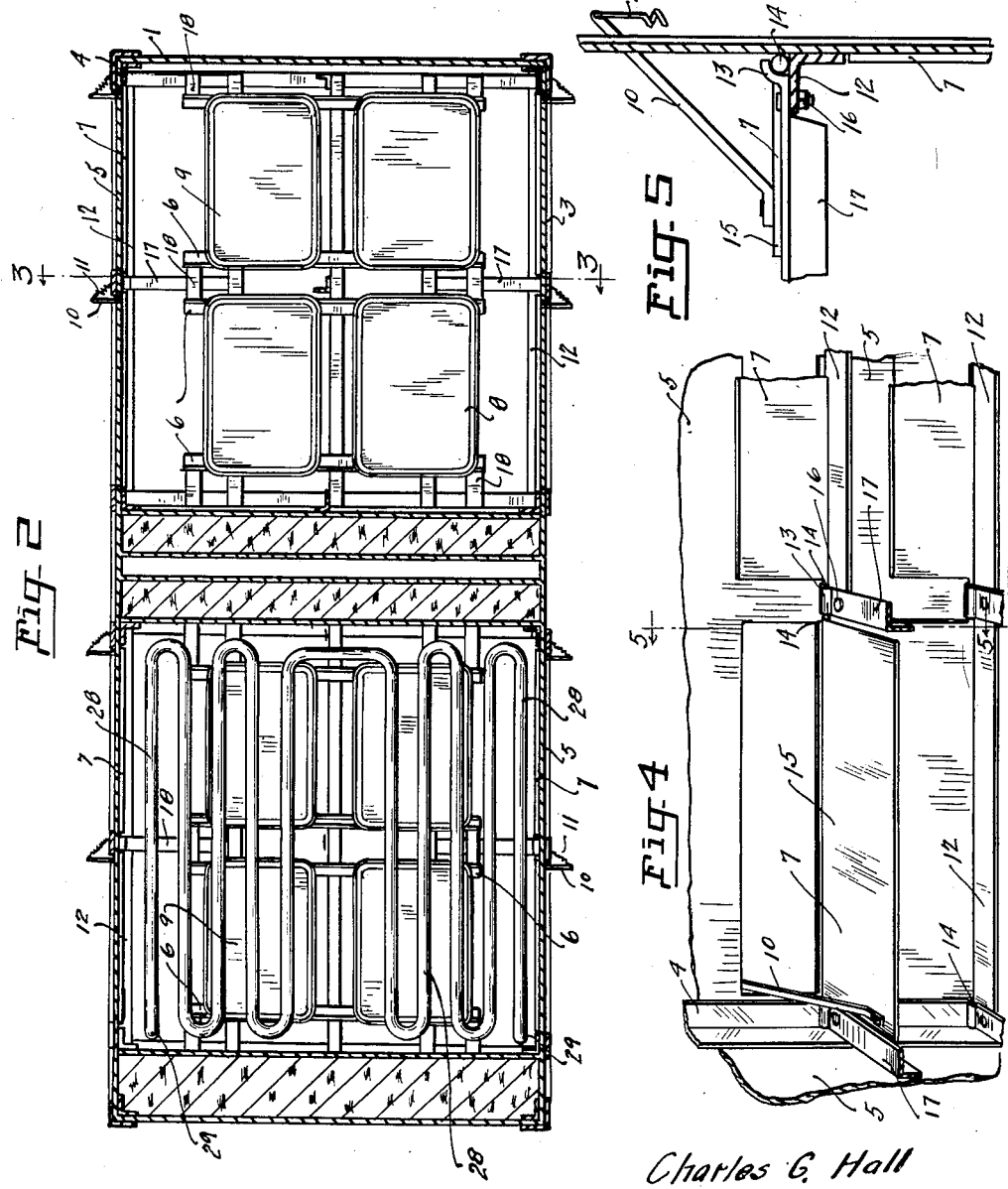

March 14, 1933. C. G. HALL 1,901,509
COMBINATION TRAY HEATING AND REFRIGERATING CABINET
Filed March 17, 1930 3 Sheets-Sheet 3
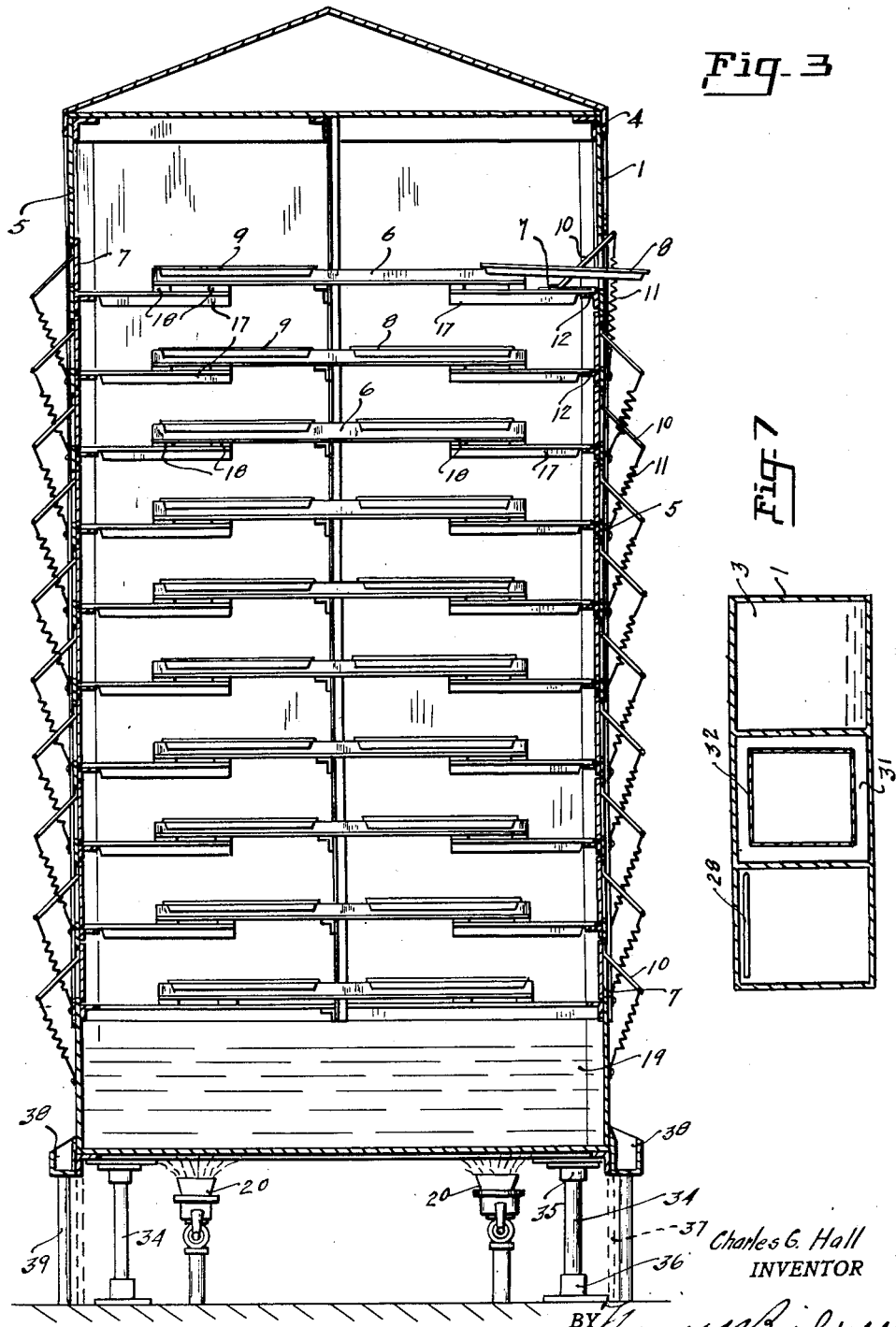
Charles G. Hall
INVENTOR Patented Mar. 14, 1933

1,901,509

UNITED STATES PATENT OFFICE

CHARLES G. HALL, OF BOISE, IDAHO, ASSIGNOR TO AUTOMATIC FOOD MACHINERY CORPORATION, OF BOISE, IDAHO, A CORPORATION OF IDAHO

COMBINATION TRAY HEATING AND REFRIGERATING CABINET

Application filed March 17, 1930. Serial No. 436,543.

My invention is primarily intended for use in kitchens of eating places and has for its primary object the maintaining of trays to be used to display food in a heated or chilled condition. The trays are prepared and placed into the cabinet through one side, and are removed from the cabinet from the opposite side when desired.

The device is especially useful when used in combination with mechanical cafeterias, or where the food is to be displayed upon a dispensing and conveying transfer that carries the food directly to the patron.

The invention in its preferred embodiment consists of a number of compartments, some of which are refrigerated compartments, and others are heated to the required temperatures. Means for controlling the humidity within the heated compartments are also provided.

Through the use of my device a relatively large number of trays may be covered with the food desired to be disposed and the covered trays are placed within the cabinet. The food on the trays will remain in prime condition, because it is maintained at the desired temperature at all times.

One of the objects of my invention consists in providing a cabinet having a plurality of compartments, each of which is adapted for having trays of food placed therein, from one side and withdrawn from the oppositely disposed side of the cabinet. Each of the compartments of the cabinet is maintained at a desired temperature for the food that is placed therein.

A still further object of my invention consists in having a cabinet that is relatively narrow in transverse width which has means for placing trays through one side of the cabinet, means to remove the trays through the oppositely disposed side. Adequate facilities are also provided for maintaining the temperature of the cabinet properly in order that the food disposed therein will remain in prime condition for relatively long periods.

A still further object of my invention consists in providing a cabinet that may be filled with trays of food from time to time which may be removed therefrom quickly and in prime condition and passed to patrons during the heavy load serving periods.

Another object of my invention consists in the forming of a cabinet having maximum storage capacity relative to the overall dimensions of the same.

Still another object of my invention consists in providing a cabinet that may be used in conjunction with mechanical cafeteries that will reduce the kitchen help to a minimum and wherein the help may be kept continuously employed during the preparation of the food before the serving periods have arrived.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a perspective, side view of one of my new and improved two-compartment cabinets.

Fig. 2 is a sectional, top, plan view of the mechanism illustrated in Fig. 1, the same being taken on line 2—2 of Fig. 1 looking in the direction indicated.

Fig. 3 is a sectional, end view of the heated end of one of my new and improved cabinets, the same being taken on line 3—3 of Fig. 2 looking in the direction indicated.

Fig. 4 is a fragmentary, perspective, top plan view of the doors of one of my new and improved cabinets.

Fig. 5 is a sectional, end view of the mechanism illustrated in Fig. 4, the same being taken on line 5—5 of Fig. 4 looking in the direction indicated.

Fig. 6 is a sectional, side view of a preferred form of embodiment of the heated end of one of my new and improved cabinets.

Fig. 7 is a sectional, side view of one of my new and improved cabinets comprising a refrigerated end adapted for the maintaining of salads, fruit and vegetables in prime condition therein, and having a heated chamber adapted for controlling the humidity therein and also having a heated chamber in which dry heat is applied to the articles to be disposed therein.

Like reference characters refer to like parts throughout the several views.

I have illustrated in Fig. 1 a two-compartment cabinet having a warmed end 1 and having a refrigerated end 2. A plurality of doors 3 are disposed upon the feeding or entrance side of each of the cabinets. Means are associated with each of the doors for normally maintaining them in closed position. The cabinet is primarily formed of a plurality of structural ribs 4 as illustrated in Fig. 4, and spaced apart to form inner and outer ribs to securely support fabricated side walls therebetween. The ribs and walls being secured together by any suitable fastening means, such as bolts, rivets or the like. Pairs of tray supporting bars 6 are disposed transversely of the cabinet with a plurality of entrance doors 7 disposed upon the entrance side of the cabinet. The supporting bars 6 are spaced apart sufficiently to permit the supporting of trays 8 thereupon. I have here shown a cabinet of a width adapted for supporting two trays 8 and 9 upon each of the supporting bars 6. The trays are entered from the entrance side of the cabinet and are removed from the discharge side of the cabinet. The cabinet should be made sufficiently narrow to permit the removal of the trays from the cabinet from one side only. The doors 7 preferably hinge inwardly. An arm 10 is secured to each of the doors and a reacting element as a spring 11 normally maintains the doors in closed position.

The doors may be made as illustrated in Fig. 6, wherein a ledge 12 is disposed upon the inside of the cabinet which is preferably formed from one of the angle bars that forms the ribs of the cabinet structure. The beams 17 are disposed transversely of the cabinet and have upturned ends 13 shaped to form a journal bearing for the shaft 14 that is formed integral with the door 15. The beams 17 are secured to the ledge 12 by any suitable fastening means, as by fastening bolts 16. Bars 18 run longitudinally of the cabinet and the cross supporting bars 6 rest directly upon the longitudinal bars 18 and are removably secured thereto. The cross supporting bars 6 are preferably made of angle irons, with the bottom leg of the angle irons extending inwardly. This arrangement forms a support upon which the trays are normally supported and upon which they slide. The vertical legs of the bars 6 form the upper walls against which the sides of the trays engage. A liquid holding tank 19 is disposed within the base of the heated end of the cabinet 1. The liquid disposed within the tank may be heated by any suitable heating elements, as by gas jets 20.

A drain pipe 21 leads through the base of the liquid holding vat and a valve 22 is disposed within the discharge pipe. The liquid disposed within the vat may be replenished through an inlet pipe 23. The pipe 24 leads to a source of supply of water and a valve 25 is disposed within the pipe. The refrigerated end 2 of the cabinet is spaced apart from the heated end by an air space 26. The refrigerated end of the cabinet has a tray supporting structure disposed therein similar to that disposed within the heated end of the cabinet. The entrance and discharge doors are also of similar construction and are disposed at the oppositely disposed sides of the cabinet. The central portion of the cabinet is surrounded by suitable insulating material as by cork lining 27. Refrigerated pipes 28 are disposed within the upper portion of the food and tray receiving compartments of the cabinet. The pipe 28 is refrigerated by any suitable refrigerant that may be circulated therethrough. The pipe 29 leads to the source of the refrigerant not here shown. Any suitable refrigerator adapted for this purpose may be utilized.

When it is desired to maintain a certain degree of humidity within the heated end of the cabinet, it may be made as illustrated in Fig. 2. When so arranged the vapors emanating from the heated liquids disposed within the vat entirely fill the tray receiving compartment of the cabinet and the vapors are permitted to enter and intermingle therein with the food.

The cabinet may be made as illustrated in Fig. 7 wherein the central portion 30 is formed central of the cabinet and is made relatively vapor-tight. The vapors within the base 31 of the cabinet are permitted to flow between spaced walls 32 and 33 of the cabinet and in this manner heat all sides of the central portion of the cabinet. When the cabinet is so made, the dry heat is supplied to the central compartment of the cabinet to maintain certain foods disposed therein in prime condition.

In the preferred embodiment shown in Fig. 8, I make my cabinet of three sections, one being a refrigerated compartment of the cabinet, one being a cabinet wherein the humidity developed within the tray supporting portion of the cabinet may be controlled and the other being so made as to permit the application of dry heat only to the tray supporting compartment.

The cabinet may be made as illustrated in Fig. 4 wherein suitable supporting legs 34 downwardly extend from the base of the cabinet. The legs 34 engage within flanged sockets 35 and 36. When so made the legs 34 can be adjusted to meet the height requirement of the cabinet. A skirt 37 is extended around the base of the cabinet to entirely inclose its base. This is optional construction and has no reference to the utility of the cabinet. This skirt is shown in dotted position in Fig. 4 only of the drawings.

A trough 38 is disposed at either side of the base of the cabinet. Its purpose is to assemble the liquids draining thereinto from the exterior, or interior of the cabinet. A common drain 39 conveys the liquids developed therein to a central receiving station not here shown.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What I claim is:

1. A cabinet of the class described comprising a plurality of inner and outer structural ribs disposed in spaced relation within the cabinet, side walls secured to and between said structural ribs, pairs of tray supporting bars disposed transversely within the cabinet, said bars of each pair spaced apart laterally and the pairs of bars being spaced apart vertically to permit the placing of the trays, thereon, said bars being also spaced from the side walls, a plurality of inwardly swingable doors disposed within each of the side walls, said doors adapted to clear the bars and remain adjacent to and parallel with them when opened, and a retracting spring secured to each of the doors and to a side wall.

2. A cabinet of the class described comprising a frame made of a plurality of ribs, side and end walls disposed about the frame, beams disposed transversely within the cabinet and in spaced relation with each other, a plurality of inwardly swingable doors secured to each of the side walls, an arm extending outwardly from each of the doors, a retracting spring secured to each of the arms and to a side wall, and a plurality of tray supporting bars secured to the beams, said bars being spaced from the doors sufficiently to allow clearance for them and being adjacent to and parallel with the doors when opened.

CHARLES G. HALL.